United States Patent
Cianciotto et al.

(10) Patent No.: US 7,182,495 B2
(45) Date of Patent: Feb. 27, 2007

(54) LIGHT MIXING AND HOMOGENIZING APPARATUS AND METHOD

(75) Inventors: Frank T. Cianciotto, Tehachapi, CA (US); George H. Butler, III, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 11/122,205

(22) Filed: May 3, 2005

(65) Prior Publication Data

US 2006/0251376 A1 Nov. 9, 2006

(51) Int. Cl.
G02B 6/24 (2006.01)

(52) U.S. Cl. ............... 362/551; 362/235; 359/618

(58) Field of Classification Search ............ 362/551, 362/234, 231, 235, 552; 359/618, 629, 638; 353/98, 99, 94, 38; 385/133, 901
See application file for complete search history.

(56) References Cited

U.S. PATENT DOCUMENTS

| | | | |
|---|---|---|---|
| 3,825,741 A * | 7/1974 | Morton et al. ............... 362/218 |
| 4,632,513 A | 12/1986 | Stowe | |
| 4,964,692 A | 10/1990 | Prescott | |
| 5,054,874 A | 10/1991 | Hill | |
| 5,375,185 A | 12/1994 | Hermsen | |
| 5,553,183 A | 9/1996 | Bechamps | |
| 5,604,837 A | 2/1997 | Tanaka | |
| 5,701,191 A | 12/1997 | Iwasaki | |
| 5,727,108 A * | 3/1998 | Hed ............... 385/133 |
| 5,803,575 A * | 9/1998 | Ansems et al. ............... 362/554 |
| 5,828,505 A | 10/1998 | Farmiga | |
| 6,038,361 A | 3/2000 | Yoshikawa et al. | |

(Continued)

FOREIGN PATENT DOCUMENTS

JP 11-017969 1/1999

(Continued)

OTHER PUBLICATIONS

U.S. Appl. No. 10/744,922, filed Dec. 23, 2003, Cianciotto et al.

(Continued)

*Primary Examiner*—Alan Cariaso
*Assistant Examiner*—Leah S Lovell
(74) *Attorney, Agent, or Firm*—MacPherson Kwok Chen & Heid LLP; Clifford Cousins (57) ABSTRACT

In accordance with one embodiment, a light mixing and homogenizing apparatus includes a first tubular member and a second tubular member. The first tubular member has a reflective interior surface, a polygonal cross section with a first maximum diameter, and a first number of sides. The first tubular member has a first end and a second end with the first end configured to receive a plurality of incoming light beams. The second tubular member has a reflective interior surface, a polygonal cross section with a second maximum diameter smaller than the first maximum diameter, and a second number of sides that is different from the first number of sides. The second tubular member has a first end disposed adjacent to a first tubular member second end. The second tubular member second end is configured to output a homogeneous light beam comprising a mixture of the plurality of incoming light beams.

21 Claims, 8 Drawing Sheets

U.S. PATENT DOCUMENTS

| | | |
|---|---|---|
| 6,104,857 A | 8/2000 | Ishiharadsa et al. |
| 6,123,436 A * | 9/2000 | Hough et al. ............... 362/296 |
| 6,149,289 A | 11/2000 | Kuramitsu et al. |
| 6,324,330 B1 | 11/2001 | Stites |
| 6,332,688 B1 | 12/2001 | Magarill |
| 6,366,308 B1 | 4/2002 | Hawryluk et al. |
| 6,771,870 B2 | 8/2004 | Strobl et al. |
| 6,792,190 B2 | 9/2004 | Xin et al. |
| 6,801,701 B1 | 10/2004 | Montgomery et al. |
| 6,857,764 B2 | 2/2005 | Kohno |
| 6,986,591 B2 * | 1/2006 | Pate ........................... 362/296 |
| 2001/0005222 A1 | 6/2001 | Yamaguchi |
| 2004/0137089 A1 | 7/2004 | Dinan |
| 2004/0137189 A1 | 7/2004 | Tellini et al. |
| 2005/0084210 A1 | 4/2005 | Cha |
| 2005/0112639 A1 * | 5/2005 | Wang et al. ................... 435/6 |
| 2005/0162853 A1 | 7/2005 | Jain |

FOREIGN PATENT DOCUMENTS

| | | |
|---|---|---|
| JP | 11-250227 | 9/1999 |

OTHER PUBLICATIONS

U.S. Appl. No. 10/857,073, filed May 28, 2004, Cianciotto et al.

* cited by examiner

LIGHT MIXING AND HOMOGENIZING APPARATUS AND METHOD

TECHNICAL FIELD

The present invention relates generally to optical guides, and more particularly to an optical apparatus for mixing and homogenizing a plurality of input light beams and producing a uniform intensity output.

RELATED ART

Optical devices to mix two or more incoming light beams are known, yet such devices typically include heavy, expensive, and delicate components which limit the application of this useful technique. Further, since the incoming light beams typically have a Gaussian, non-uniform intensity distribution, additional components are typically required to produce a uniform intensity distribution. Such additional components contribute to the increased cost and weight of the optical system. Thus, there remains a need for an apparatus and method to produce a mixed and homogenized output light beam from a plurality of non-homogenous incoming light beams in a rugged, compact, and low cost manner.

SUMMARY

Apparatuses, systems, and methods are disclosed herein to provide light mixing and homogenization of a plurality of incoming light beams. For example, in accordance with an embodiment of the present invention, a light mixing and homogenizing apparatus includes a first tubular member and a second tubular member. The first tubular member has a reflective interior surface and a polygonal cross section with a first maximum diameter and a first number of sides. The first tubular member has a first end and a second end with the first tubular member first end configured to receive a plurality of incoming light beams. The second tubular member has a reflective interior surface and a polygonal cross section with a second maximum diameter smaller than the first maximum diameter, and a second number of sides different from the first number of sides. The second tubular member has a first end disposed adjacent to the first tubular member second end. The second tubular member has a second end configured to output a homogeneous light beam comprising a mixture of the plurality of incoming light beams.

According to another embodiment, a light mixing and homogenizing system includes a plurality of light sources, a tubular body, and a divider located within a first portion of the tubular body. Each light source provides a light beam having a unique wavelength. The tubular body has a first end portion with a square cross section and a second end portion with a hexagonal cross section. The first end portion is configured to receive the plurality of light beams. The tubular body second end portion is configured to output a homogeneous light beam including a mixture of the incoming light beams. An interior portion of the tubular body has a highly reflective surface configured to reflect light from the plurality of incoming light beams causing a mixing and homogenizing of the plurality of light beams. The divider is located within the tubular body first end portion and is configured to separate the incoming light beams prior to mixing.

According to yet another embodiment of the present invention, a method of mixing and homogenizing a plurality of light beams includes the operations of receiving the light beams into a divided first portion of an optical funnel, mixing the received light beams within an undivided second portion of the optical funnel to produce a mixed light beam, homogenizing the mixed light beam to produce a homogenized light beam having a substantially equal intensity distribution in a direction perpendicular to the path of the homogenized beam, and outputting the homogenized beam.

The present disclosure teaches structures and methods that fulfill long felt needs in the industry by producing a mixed and homogenized light beam from a plurality of incoming light beams, where each of the incoming light beams has a non-uniform, gaussian intensity distribution. In particular, the structures and methods disclosed have particular application to diverse technology areas including optical components, entertainment, automotive, and mass communications. The disclosed structure is beneficial because it does not include a traditional, filled optical cavity or optical components such as beam splitters, and thus may be manufactured more economically. Additionally, the disclosed structure is rugged and may be used in applications that may receive physical shock. Since no additional optical components are needed, alignment issues are eliminated.

The scope of the present invention is defined by the claims, which are incorporated into this section by reference. A more complete understanding of embodiments of the present invention will be afforded to those skilled in the art, as well as a realization of additional advantages thereof, by a consideration of the following detailed description. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
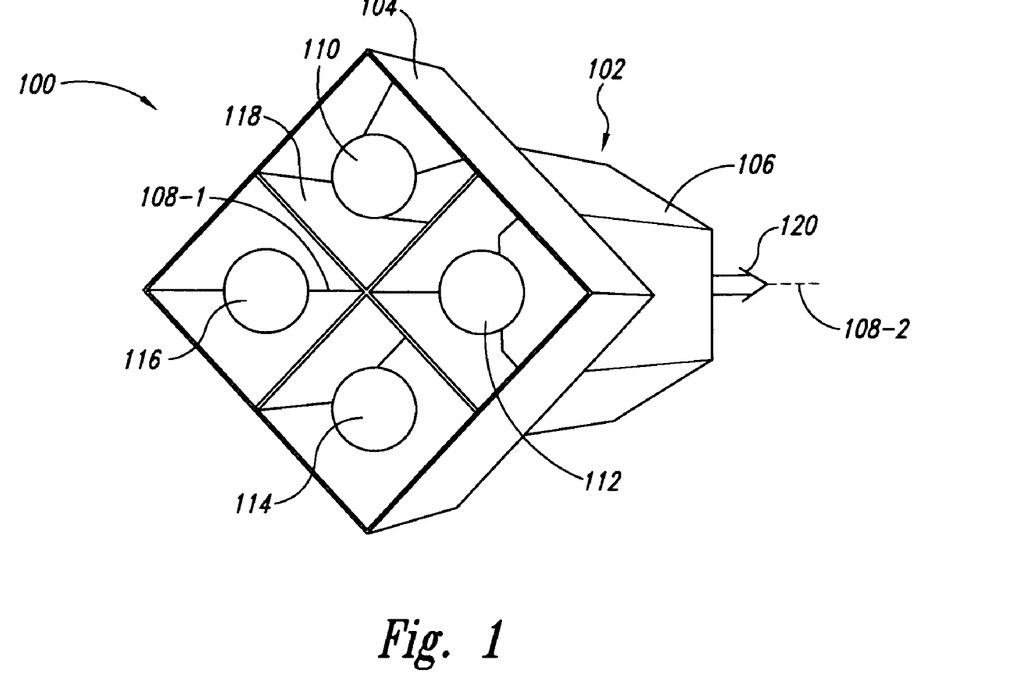
FIG. 1 shows a first perspective view of the light mixing and homogenizing apparatus with the divider member inserted along the longitudinal axis in accordance with an embodiment.

In reference to FIG. 1, an embodiment of a light mixing and homogenizing apparatus 100 includes a tubular body 102 having a first end portion or tubular member 104 with a square cross-section and a second end portion or tubular member 106 with a hexagonal cross-section. Both first end portion 104 and second end portion 106 are arranged about a central, longitudinal axis 108 so that the geometric cross-section for each end portion (104, 106) extends symmetrically in the direction of longitudinal axis 108 forming sides of the end portions.

In this disclosure, longitudinal axis 108 can include a central line passing symmetrically through the long or axial direction of tubular body 102 equidistant from each side member in first end portion 104 and second end portion 106. First end portion 104 can receive a plurality of incoming light beams (110, 112, 114, 116), each incoming light beam has a Gaussian distribution where the intensity at the center of the incoming beam is higher than near the edges. A dividing member 118 separates incoming light beams (110, 112, 114, 116) prior to mixing and typically extends the entire length of first portion 104.

The received light beams are mixed by reflection off a highly reflective interior surface of tubular body 102 so that second end portion 106 outputs a mixed, homogenized light beam 120 having a color determined by the intensity and wavelength of each incoming light beam. Any or all of incoming light beams (110, 112, 114, and 116) may be either coherent beams comprising a single wavelength of light, or incoherent beams comprising multiple wavelengths. In this disclosure, a plurality of light beams are mixed when a composite light beam is formed having wavelength components from each of the plurality light beams. Similarly, a mixed light beam is homogenized when the mixed light beam has a substantially equal intensity distribution in a direction perpendicular to the output beam path.

Figure 2:
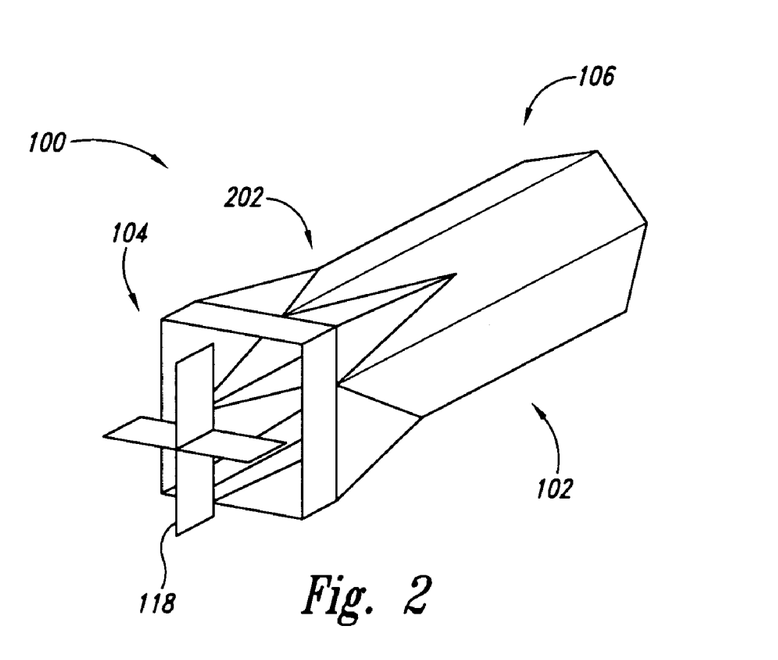
FIG. 2 shows a second perspective view of the light mixing and homogenizing apparatus with the divider removed in accordance with an embodiment.

FIG. 2 shows dividing member 118 removed from first end 104 of tubular body 102. A middle portion 202 of tubular body 102 includes a plurality of angled planes joining the different polygonal shapes of first end portion 104 and second end portion 106, and where each of the incoming light beams is initially reflected. A small portion of light from the incoming light beams may pass through the center portion of tubular body 102 without being reflected from the internal surface and without disturbing the homogenous intensity profile. Even though a square-to-hexagonal shaped transition is shown in this disclosure, other geometrical cross-sections may be used for both first end section 104 and second end section 106 so that middle portion 202 comprises a plurality of planar members that join first end portion 104 to second end portion 106.

Figure 3:
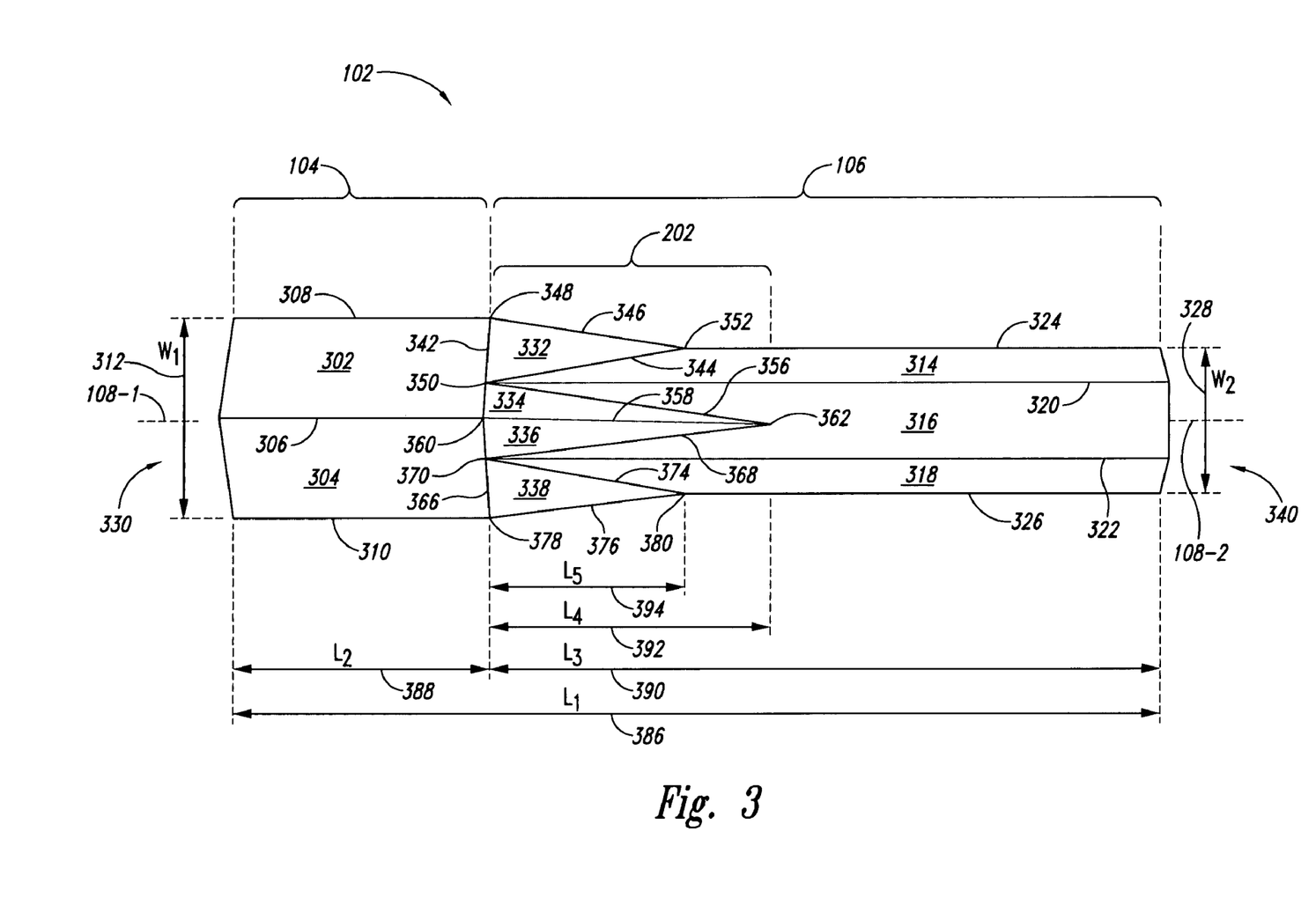
FIG. 3 shows a side view of the light mixing and homogenizing apparatus in accordance with an embodiment.

FIG. 3 shows a side view of light mixing and homogenizing apparatus 100 including first end portion 104, second end portion 106, and middle portion 202 for joining or mating first end portion 104 and second end portion 106. In one embodiment, first end portion 104 includes a first square side member 302 and a second square side member 304 where each square side (302, 304) has a planar outer surface extending along longitudinal axis 108 to form the sides of square first end portion 104. The geometrical cross-section of first end portion 104 determines the number of sides, where a square cross-section has four sides. At the juncture between square side 302 and square side 304 is an edge 306 that runs parallel to longitudinal axis 108. Similarly, at the juncture between square side 302 and an adjoining square side (not shown) in a direction away from square side 304 is an edge 308 that runs parallel to longitudinal axis 108.

Finally, at the juncture between square side 304 and an adjoining square side (not shown) in a direction away from square side 302 is an edge 310 that runs parallel to longitudinal axis 108. In this manner, the polygonal cross-section of first end portion 104 extends in the direction of longitudinal axis 108 in order to form a hollow, square structure with a diagonal opening maximum opening width $W_1$ 312 corresponding to a maximum diameter of the first end portion 104. Measured at the corners of first end portion 104, $W_1$ represents the largest opening width. The inner surfaces of first portion 104 are highly reflective in order to reflect light within tubular body 102. In one embodiment, the width of the surface of each square side (302, 304) is 1.931 cm as measured perpendicular to longitudinal axis 108. The maximum width $W_1$ 312 is dependent upon the length of tubular body 102.

Second end portion 106 includes a first hexagonal side member 314, a second hexagonal side member 316, and a third hexagonal side member 318 where each hexagonal side (314, 316, 318) has a planar outer surface extending along longitudinal axis 108 to form the sides of hexagonal second end portion 106. The geometrical cross-section of second end portion 106 determines the number of sides, where a hexagonal cross-section has six sides. At the juncture between hexagonal side 314 and hexagonal side 316 is an edge 320 that runs parallel to longitudinal axis 108. Similarly, at the juncture between hexagonal side 316 and hexagonal side 318 is an edge 322 that runs parallel to longitudinal axis 108. At the juncture between hexagonal side 314 and an adjoining hexagonal side (not shown) in a direction away from hexagonal side 316 is an edge 324 that runs parallel to longitudinal axis 108. The line of edge 308 and the line of edge 324 define a plane (not shown) that passes through the center of tubular body 102 along longitudinal axis 108.

Finally, at the juncture between hexagonal side 318 and an adjoining hexagonal side (not shown) in a direction away from hexagonal side 316 is an edge 326 that runs parallel to longitudinal axis 108. The line of edge 310 and the line of edge 326 define a plane (not shown) that passes through the center of tubular body 102 along longitudinal axis 108. In this manner, the polygonal cross-section of second end portion 106 extends in the direction of longitudinal axis 108 in order to form a hollow, hexagonal structure with a maximum opening width $W_2$ 328 corresponding to a maximum diameter of second end portion 106. The inner surfaces of second portion 106 are highly reflective in order to reflect light within tubular body 102. In one embodiment, maximum width $W_2$ 328 is 2.000 cm, while the minimum width measured perpendicular to opposing sides is 1.732 cm. The width measured between opposite corners of the polygonal cross-section of second end portion 106 is equal to a non-maximum width of the polygonal cross-section of first end portion 104 so that at least one longitudinal edge (320, 322) coincides with a side of first end portion 104.

Middle portion 202 includes a first triangular side member 332, a second triangular side member 334, a third triangular side member 336, and a fourth triangular side member 338. Each triangular side (332, 334, 336, and 338) has a planar outer surface extending at an angle along longitudinal axis 108 to form a generally conically shaped middle portion 202 that joins the wider first portion 104 with the narrower second portion 106. The inner surfaces of middle portion 202 are highly reflective in order to reflect light within tubular body 102. Light received in first portion 104 is conducted through middle portion 202 and exits second portion 106 so that tubular body 102 comprises a light funnel having a wider input 330 and a narrower output 340.

Triangular side 332 joins a first portion of square side 302 with hexagonal side 314. At the juncture between triangular side 332 and square side 302 is an edge 342 that runs within a plane (not shown) that is perpendicular to longitudinal axis 108. At the juncture between triangular side 332 and hexagonal side 314 is an edge 344 that runs on hexagonal side 314 from edge 320 to edge 324. Finally, at the juncture between triangular side 332 and an adjoining triangular side (not shown) in middle portion 202 is an edge 346 that runs from square side 302 to hexagonal side 314 within the plane defined by the line of edge 308 and the line of edge 324 that passes through the center of tubular body 102 along longitudinal axis 108. Edge 346 has a slope determined by the difference between $W_1$ 312 and $W_2$ 328. Triangular side 332 is also bounded by a first vertex 348 where edge 342 meets edge 346, a second vertex 350 where edge 342 meets edge 344, and a third vertex 352 where edge 344 meets edge 346. Vertex 348 coincides with a longitudinal edge 308 of square side 302, vertex 350 coincides with a longitudinal edge 320 of hexagonal side 314, and vertex 352 coincides with a longitudinal edge 324 of hexagonal side 314. In this manner, the different geometries of first portion 104 and second portion 106 are joined using an angled planar member having vertices that coincide with longitudinal edges.

Triangular side 334 joins a second portion of square side 302 with hexagonal side 316. The juncture between triangular side 334 and the second portion of square side 302 is along edge 342. At the juncture between triangular side 334 and hexagonal side 316 is an edge 356 that runs on hexagonal side 316 from edge 348 to a central portion of hexagonal side 316. Triangular side 334 is adjacent to triangular side 336. At the juncture between triangular side 334 and triangular side 336 is an edge 358 that runs within a plane defined by the line of edge 306 and the central longitudinal axis 108. Triangular side 334 is also bounded by a first vertex 350 where edge 342 meets edges 344 and 356, a second vertex 360 where edge 342 meets edge 358, and a third vertex 362 where edge 356 meets edge 358. Edge 358 has a slope corresponding to the slope of edge 346 so that the sides are symmetrical. Vertices 360 and 362 correspond to a line of longitudinal edge 308. In this manner, the different geometries of first portion 104 and second portion 106 are joined using an angled planar member having vertices that coincide with the longitudinal edges of the geometries of at least one of first end portion 104 and second end portion 106.

Triangular side 336 joins a first portion of square side 304 with hexagonal side 316. The juncture between triangular side 336 and the first portion of square side 304 is along edge 366 within the plane perpendicular to longitudinal axis 108 that includes edge 342. At the juncture between triangular side 336 and hexagonal side 316 is an edge 368 that runs on hexagonal side 316 from edge 366 to a central portion of hexagonal side 316. Triangular side 336 is also bounded by a first vertex 360 where edge 366 meets edges 358 and 342, a second vertex 370 where edge 366 meets edge 368, and a third vertex 362 where edge 368 meets edges 356 and 358. Vertex 370 corresponds to a line of longitudinal edge 322. In this manner, the different geometries of first portion 104 and second portion 106 are joined using an angled planar member having vertices that coincide with the longitudinal edges of the geometries of at least one of first end portion 104 and second end portion 106.

Triangular side 338 joins a second portion of square side 304 with hexagonal side 318 along edge 366. At the juncture between triangular side 338 and hexagonal side 318 is an edge 374 that runs on hexagonal side 318 from edge 322 to edge 326. Finally, at the juncture between triangular side 338 and an adjoining triangular side (not shown) in middle portion 202 in a direction away from triangular side 336 is an edge 376 that runs from square side 304 to hexagonal side 318 within the plane defined by the line of edge 310 and the line of edge 326 that passes through the central longitudinal axis 108. Edge 376 has a slope determined by the difference between $W_1$ 312 and $W_2$ 328 and is a symmetric reflection of the slope of edge 346. Triangular side 338 is also bounded by a first vertex 370 where edge 366 meets edges 368, 322, and 374, a second vertex 378 where edge 366 meets edge 376, and a third vertex 380 where edge 376 meets edges 374 and 326. Vertex 370 coincides with a longitudinal edge 322 of hexagonal side 302, vertex 366 coincides with a longitudinal edge 310 of square side 304, and vertex 380 coincides with a longitudinal edge 326 of hexagonal side 318. In this manner, the different geometries of first portion 104 and second portion 106 are joined using an angled planar member 338 having vertices that coincide with longitudinal edges on first portion 104 or second portion 106. Due to symmetry, corresponding planar members located oppositely are similar.

The overall length of tubular body 102 along longitudinal axis 108 is shown as $L_1$ 386, the length of first end portion 104 is $L_2$ 388, giving a remainder length $L_3$ 390 corresponding to the length of second end portion 106. $L_4$ 392 is an outer length of middle portion 202 while $L_5$ 394 is an inner length of middle portion 202 corresponding to the longitudinal extent of the triangular side members extending to a wider section of second end portion 106. Similarly, $L_4$ 392 corresponds to the longitudinal extent of the triangular side members extending to a narrower section of second end portion 106. In one embodiment, $L_1$ 386 is 13.600 centimeters (cm) in length, $L_2$ 388 is 3.800 cm in length, $L_3$ 390 is 9.800 cm in length, $L_4$ 392 is 4.034 cm in length, and $L_5$ 394 is 2.951 cm in length. In this manner, the ratio of the linear distance along central axis 108 of $L_2$ to $L_3$ is 3.800 cm/9.800 cm=0.3878, and can range from about 0.3500 to 0.4500. The maximum width $W_1$ 312 is dependent upon the length of tubular body 102 so that the length $L_1$ 386 is at least five-times larger than width $W_1$ 312.

Figure 4:
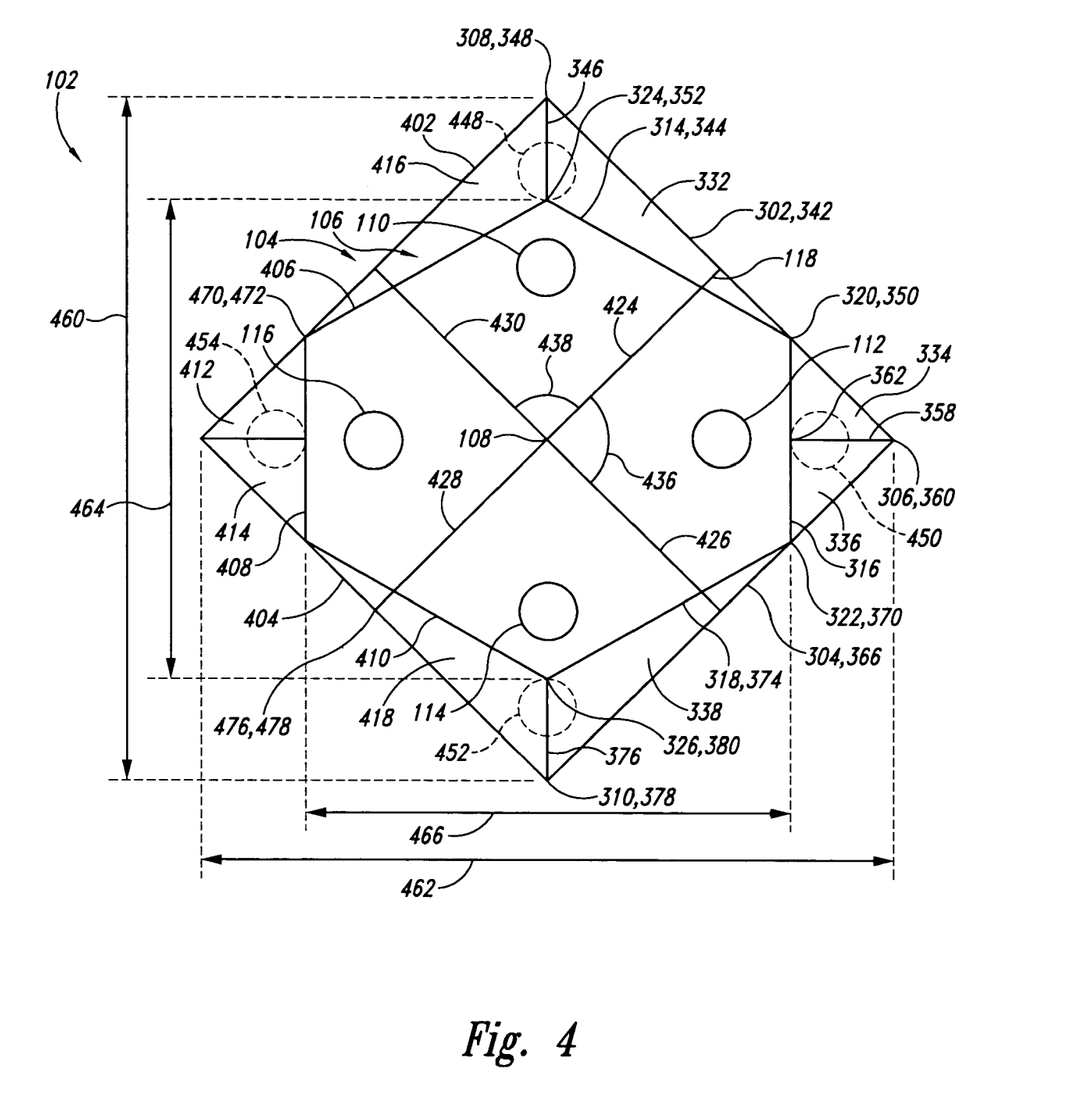
FIG. 4 shows an end view of tubular body as viewed from the first end of first tubular member where first tubular member is a regular, square polygon having equal length sides while second tubular member is not a regular, hexagonal polygon, in accordance with an embodiment.

FIG. 4 shows an end view of tubular body 102 as viewed from the first end of first tubular member 104 where first tubular member 104 is a regular, square polygon having equal length sides while second tubular member 106 is not a regular, hexagonal polygon. In this case, the four sides (302, 304, 402, and 404) of first tubular member 104 meet at 90-degrees at the juncture between adjacent sides. The six sides (314, 316, 318, 406, 408, and 410) of second tubular member 106 for a hexagonal polygon that is compressed in a vertical direction so as to allow an approximately equal vertical height for edge 346 and horizontal width for edge 358. In this manner, the planar aspect presented by the horizontal reflective internal surfaces (334, 336, 412, and 414) are similar in size to the vertical reflective internal surfaces (332, 416, 338, and 418).

Dividing member 118 includes a plurality of radii (424, 426, 428, 430) emanating from a central portion of tubular body 102 along central axis 108. In one embodiment, it is preferable for the distal ends of dividing member 118 radii to meet the internal reflective surface of each side near a midpoint of the side. Since first portion 104 is a regular, square polygon, adjacent radii form right angles with each other where angle 436 between radii (424, 426) is 90-degrees, and angle 438 between adjacent radii (424, 430) is 90-degrees so that the light receiving end of tubular body 102 is divided into square regions. Other configurations are possible (not shown) including where the distal ends of radii (424, 426, 428, and 430) are coincident with the corners of square first end portion 104 so that the light receiving end of tubular body 102 is divided into triangular regions by vertical and horizontal divisions. The square or triangular regions form a cavity for separating the incoming beams (110, 112, 114, 116) prior to mixing.

In the case where coherent or non-dispersive light is received parallel to the central axis 108, it is desirable to reflect the incoming beam from a reflective surface in middle section 202 in order to avoid a "hot spot" in the homogeneous output of tubular body 102. Incoming coherent beams are applied to the reflecting surfaces of middle portion 202 in order to induce mixing and homogenization within second end portion 106. For example, a first coherent beam 448 is applied to a first pair of reflecting surfaces (332 and 416), a second coherent beam 450 is applied to a second pair of reflecting surfaces (334, 336), a third coherent beam 452 is applied to a second pair of reflecting surfaces (338, 418), and a fourth coherent beam 454 is applied to a fourth pair of reflecting surfaces (412, 414).

Each of these incoming coherent beams is applied to a reflecting surface within middle portion 202 in order to initiate mixing. According to this embodiment of tubular body 102, square first tubular member 104 has a vertical height 460 and a horizontal width 462. Similarly, hexagonal second tubular member 106 has a vertical height 464 and a horizontal width 466 which are equal to each other. Longitudinal edge 320 meets and end portion of side 302 at vertex 350. Similarly, longitudinal edge 322 meets an end portion of side 304 at vertex 370. Due to symmetry, a longitudinal edge 470 between second tubular member 106 sides 406 and 408 meets first tubular member 104 side 402 at a vertex 472, and a longitudinal edge 476 between second tubular member 106 sides 408 and 410 meets first tubular member 104 side 404 at a vertex 478.

Figure 5:
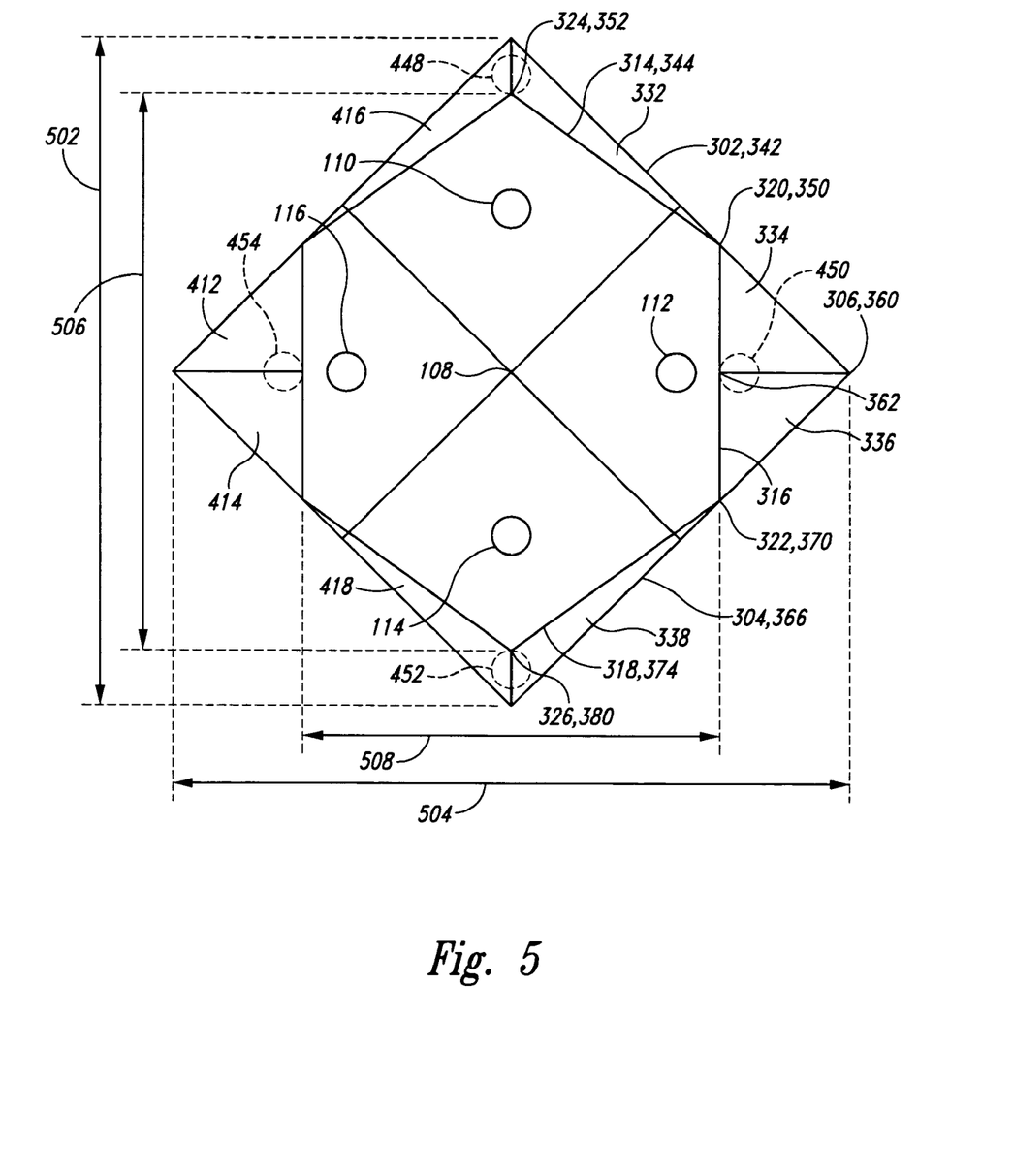
FIG. 5 shows and end view of tubular body as viewed from the first end of first tubular member where first tubular member is a regular, square polygon having equal length sides while second tubular member is a regular, hexagonal polygon, also having equal length sides, in accordance with an embodiment.

FIG. 5 shows and end view of tubular body 102 as viewed from the first end of first tubular member 104 where first tubular member 104 is a regular, square polygon having equal length sides while second tubular member 106 is a regular, hexagonal polygon, also having equal length sides. In this manner, the planar aspect presented by the horizontal reflective internal surfaces (334, 336, 412, and 414) is different from the planar aspect presented by the vertical reflective internal surfaces (332, 416, 338, and 418).

According to this embodiment of tubular body 102, square first tubular member 104 has a vertical height 502 and a horizontal width 504. Similarly, hexagonal second tubular member 106 has a vertical height 506 and a horizontal width 508. Since first tubular member 104 is square, vertical height 502 is equal to horizontal width 504. However, since second tubular member 106 is a regular hexagon, vertical height 506 is greater than horizontal width 508. A result of having regular polygonal structures such as the square first tubular member 104 and the hexagonal tubular member 106, the planar aspect presented by the horizontal reflective internal surfaces (334, 336, 412, and 414) is larger than the planar aspect presented by the vertical reflective internal surfaces (332, 416, 338, and 418). Thus, when using a coherent incoming beam, the reflecting target is smaller for the vertical reflective internal surfaces (332, 416, 338, and 418).

Figure 6:
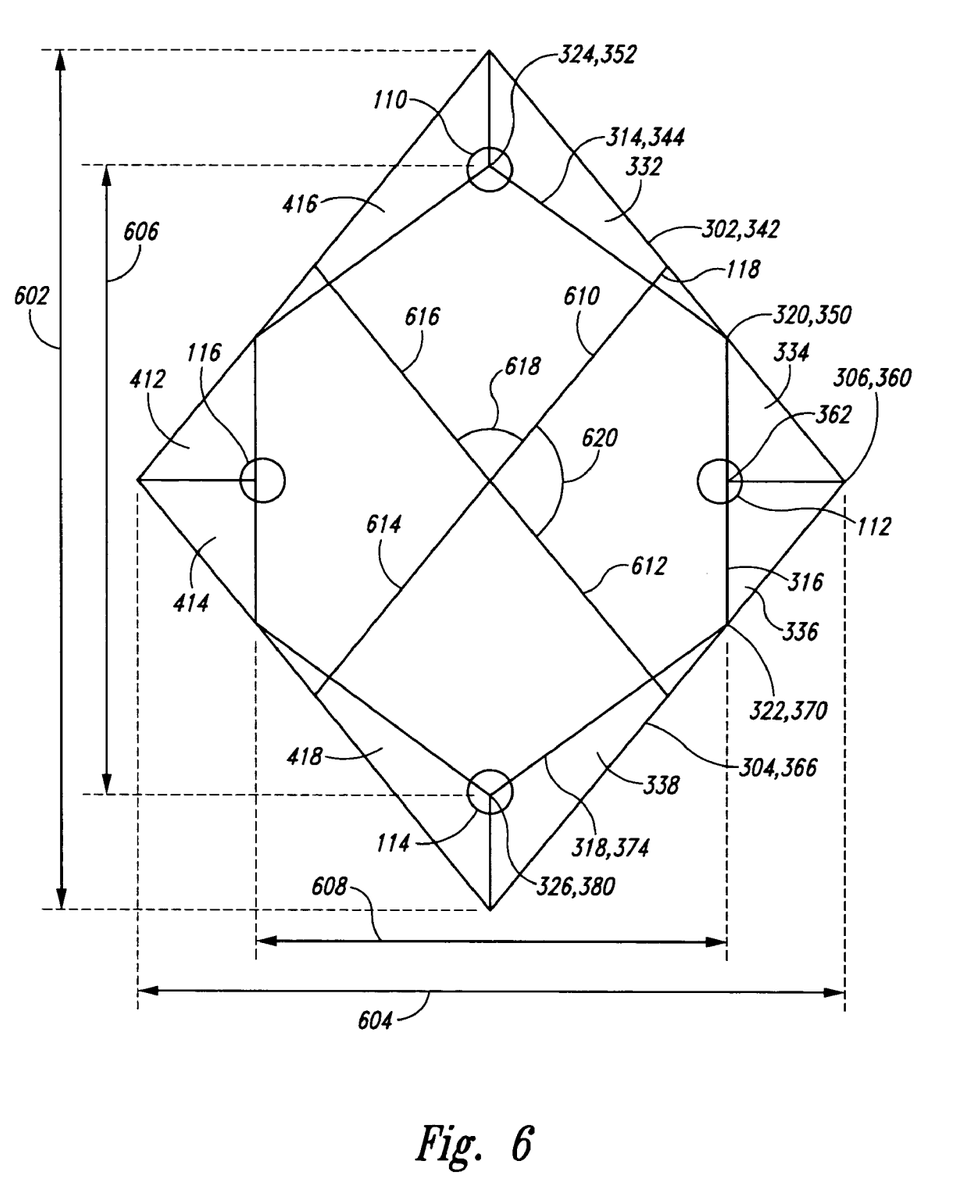
FIG. 6 shows and end view of tubular body as viewed from the first end of first tubular member where first tubular member is not a regular, square polygon yet still has equal length sides, while second tubular member is a regular, hexagonal polygon having equal length sides.

FIG. 6 shows and end view of tubular body 102 as viewed from the first end of first tubular member 104 where first tubular member 104 is not a regular, square polygon yet still has equal length sides, while second tubular member 106 is a regular, hexagonal polygon having equal length sides. In this manner, the planar aspect presented by the horizontal reflective internal surfaces (334, 336, 412, and 414) are similar to the vertical reflective internal surfaces (332, 416, 338, and 418). According to this embodiment of tubular body 102, first tubular member 104 has a vertical height 602 and a horizontal width 604. Similarly, hexagonal second tubular member 106 has a vertical height 606 and a horizontal width 608. Dividing member 118 includes a plurality of radii (610, 612, 614, 616) emanating from a central portion of tubular body 102 along central axis 108. Since first portion 104 is not a regular, square polygon, adjacent radii do not form right angles with each other where angle 618 between radii (610, 616) is acute, and angle 620 between adjacent radii (612, 614) is obtuse so that the light receiving end of tubular body 102 is divided into rhomboid regions similar to the shape of the first portion 104.

Figure 7:
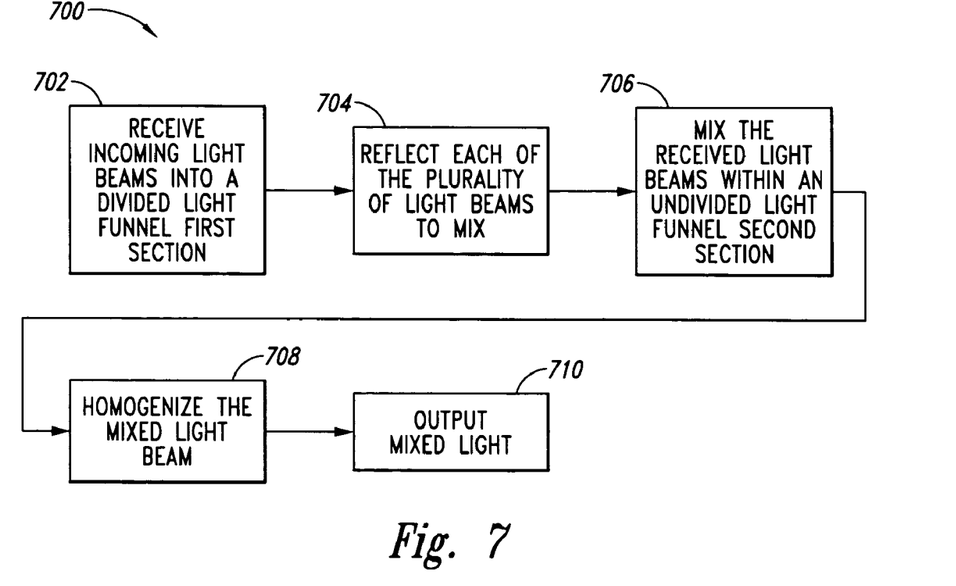
FIG. 7 shows a flow diagram indicating operations for a method of using a light mixing and homogenizing apparatus, in accordance with an embodiment.

FIG. 7 shows a flow diagram 700 indicating operations for a method of producing mixed and homogenized light from a plurality of incoming light beams each having a different wavelength using a light mixing and homogenizing apparatus. The operations include receiving 702 a plurality of incoming light beams into the divided light funnel first portion as described in reference to FIG. 3. The method continues with an operation of reflecting 704 light off the interior surface of an undivided light funnel second portion. The method continues with mixing 706 the received light beams within the light funnel second portion. The method continues with homogenizing 708 the mixed light to produce a homogenized light beam having a substantially equal intensity distribution. Finally, the method concludes with outputting 710 the mixed and homogenized light.

Figure 8:
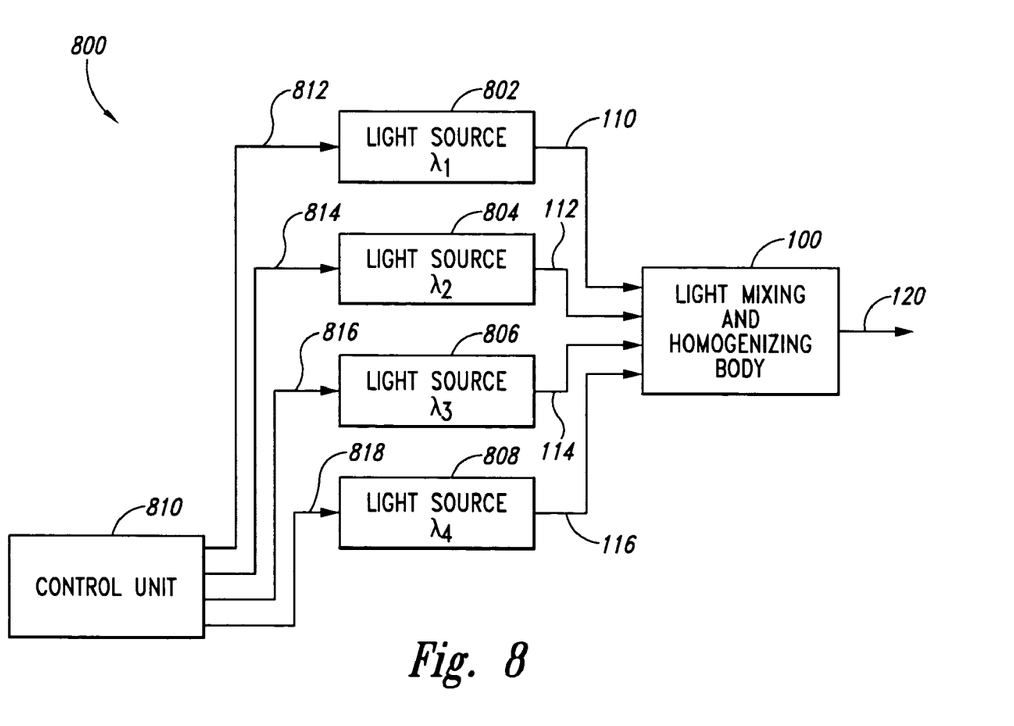
FIG. 8 shows a block diagram of a light mixing and homogenizing system that includes a plurality of light sources, a control unit, and a light mixing and homogenizing apparatus, in accordance with an embodiment.

FIG. 8 shows a block diagram of a light mixing and homogenizing system 800 that includes a plurality of light sources (802, 804, 806, and 808), a control unit 810, and a light mixing and homogenizing apparatus 100. Each light source outputs light of a different frequency or wavelength. For example, a first light source 802 outputs a first light beam 110 having a first wavelength $\lambda_1$. A second light source 804 outputs a second light beam 112 having a second wavelength $\lambda_2$ that is different from first wavelength $\lambda_1$. A third light source 806 outputs a third light beam 114 having a third wavelength $\lambda_3$ that is different from first wavelength $\lambda_1$, and second wavelength $\lambda_1$. Finally, a fourth light source 808 outputs a fourth light beam 116 having a fourth wavelength $\lambda_4$ that is different from first wavelength $\lambda_1$, second wavelength $\lambda_2$, and third wavelength $\lambda_3$. Although only four light sources are shown, the number of light sources is not limited to this example.

Control unit 810 outputs a plurality of control signals (812, 814, 816, and 818) in order to determine the intensity and wavelength of light emitted from each light source. In this manner, a continuously variable homogenized light beam may be produced having a color determined by the wavelength components of the plurality of incoming light beams. For example, control unit 810 asserts a first control signal 812 to first light source 802 in order to determine the intensity and wavelength of first light beam 110 emitted from light source 802.

A light beam from a light source may be conducted in an optical conduit such as an optical fiber prior to introduction within light mixing and homogenizing apparatus 100. The optical fiber may be considered as a part of the light source. Similarly, control unit 810 asserts a second control signal 814 to second light source 804 in order to determine the intensity and wavelength of second light beam 112 emitted from light source 804. Control unit 810 asserts a third control signal 816 to second light source 806 in order to determine the intensity and wavelength of second light beam 114 emitted from light source 806. Finally, control unit 810 asserts a second control signal 816 to second light source 808 in order to determine the intensity and wavelength of second light beam 116 emitted from light source 808.

Figure 9:
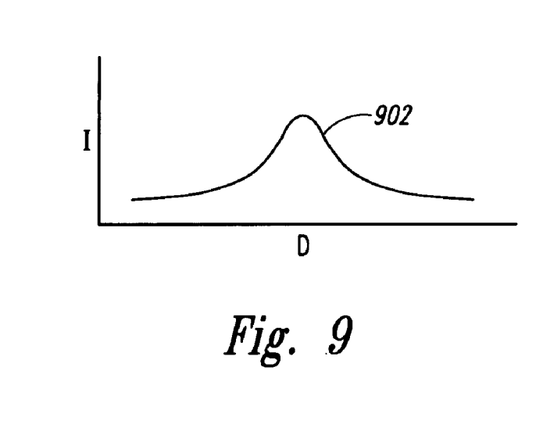
FIG. 9 shows an example of light intensity from a single optical fiber output where the light intensity profile varies across the diameter, in a direction perpendicular to the cross section of the fiber, with a typical Gaussian intensity distribution.
Figure 10:
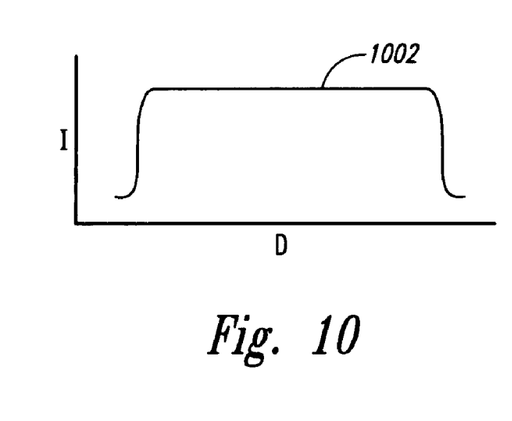
FIG. 10 shows an example of light output from the light mixing and homogenizing apparatus producing a uniform intensity across the span of the tubular body output, with a typical top-hat intensity distribution.

FIG. 9 shows an example of light intensity from a single optical fiber output where the light intensity profile varies across the diameter, in a direction perpendicular to the cross section of the fiber, in a Gaussian distribution 902. FIG. 10 shows an example of light output from the light mixing and homogenizing apparatus producing a uniform intensity or top-hat profile 1002 across the span of the tubular body output.

Figure 11:
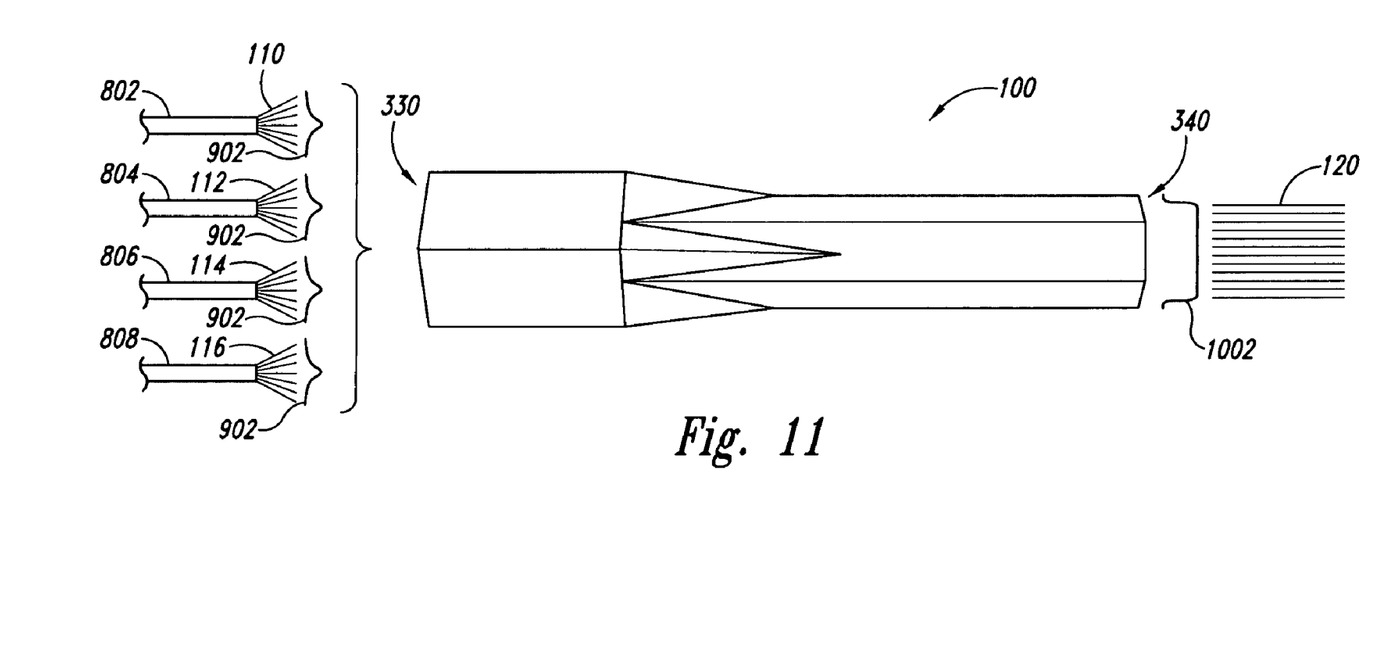
FIG. 11 shows a plurality of incoming light sources producing a plurality of incoming light beams that are applied to a wider input as a receiving end of the light mixing and homogenizing apparatus.

FIG. 11 shows a plurality of incoming light sources (802, 804, 806, and 808) producing a plurality of incoming light beams (110, 112, 114, and 116) that are applied to a wider input 330 as a receiving end of light mixing and homogenizing apparatus 100. Each incoming light beam has a gaussian profile 902. Output beam 120 has a top-hat profile 1002 and is emitted from narrower output 340 as an outputting end of light mixing and homogenizing apparatus 100.

Figure 12:
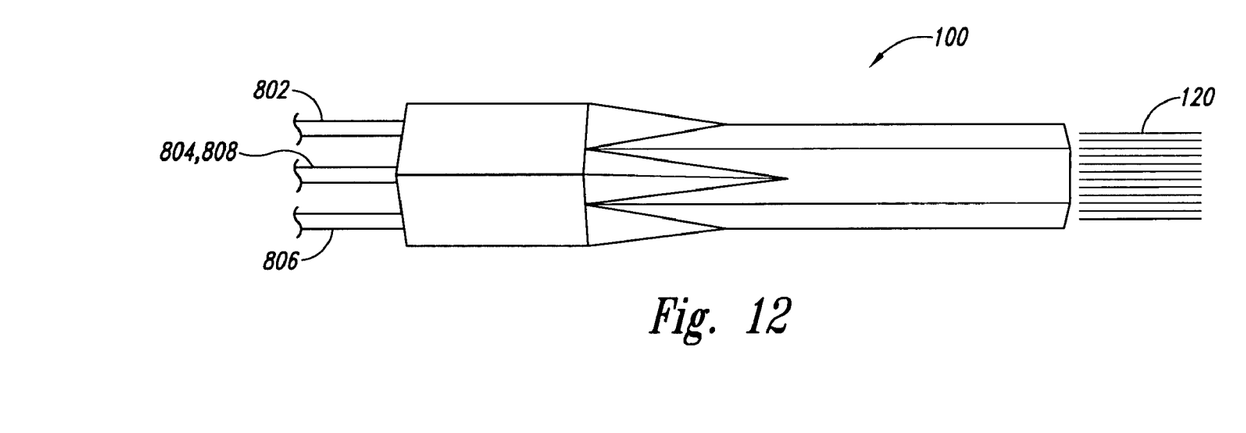
FIG. 12 shows the plurality of incoming light sources located within a receiving portion of the tubular body.

FIG. 12 shows the plurality of incoming light sources disposed within a receiving portion of the tubular body. A plurality of optical fibers (not shown) may be bundled together to receive the mixed and homogenized light from output 340. In this manner, the mixed and homogenized light may be applied evenly to each of the optical fibers in the bundle. Alternatively, the light from output 340 may be emitted directly into the air or another medium.

Figure 13:
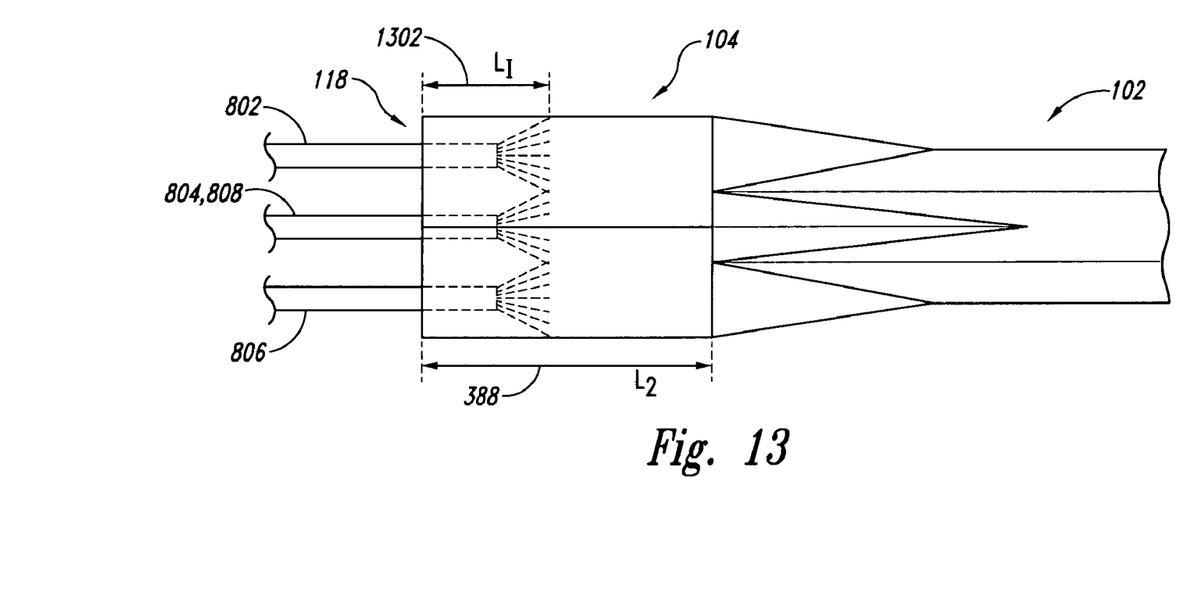
FIG. 13 shows the ends of each light source as inserted within the tubular body first end portion.

FIG. 13 shows the ends of each light source (802, 804, 806, and 808) as inserted within the tubular body first end portion 104. As shown, the light sources are inserted within first portion 104 a depth 1302 $L_I$ which allows the light beam from each light source to be introduced into the interior portion of tubular body 102 prior to mixing since the incoming light beams are separated from each other by dividing member 118. Depth 1302 corresponds to the insertion depth of the light beams within first portion 104, and can vary from near the leading edge of the interior surface of first portion 104 to about half the length 388 $L_2$ of first portion 104.

Embodiments described above illustrate but do not limit the invention. It should also be understood that numerous modifications and variations are possible in accordance with the principles of the present invention. Accordingly, the scope of the invention is defined only by the following claims.

We claim:

1. A light mixing and homogenizing apparatus, comprising:
   a first tubular member having a reflective interior surface and a polygonal cross section with a first maximum diameter and a first number of sides, the first tubular member having a first end and a second end, the first tubular member first end being configured to receive a plurality of incoming light beams; and
   a second tubular member having a reflective interior surface and a polygonal cross section with a second maximum diameter smaller than the first maximum diameter and a second number of sides different from the first number of sides, the second tubular member having a first end disposed adjacent to the first tubular member second end, the second tubular member having a second end configured to output a homogeneous light beam comprising a mixture of the plurality of incoming light beams.

2. The apparatus of claim 1,
   wherein a longitudinal edge is formed at the juncture of each pair of adjacent second tubular member sides, and
   wherein at least one of the second tubular member first end longitudinal edges coincides with an end portion of a side of the first tubular member second end.

3. The apparatus of claim 1, further comprising:
   a plurality of planar members configured to mate the first tubular member second end with the second tubular member.

4. The apparatus of claim 3, wherein the plurality of planar members form a funnel shape having a larger portion and a smaller portion, the larger portion of the funnel shape being disposed adjacent to the first tubular member second end.

5. The apparatus of claim 3, wherein the plurality of planar members each has a triangular shape having at least one vertex coincident with one of a first tubular member and a second tubular member longitudinal edge.

6. The apparatus of claim 3, wherein the planar members configured to mate the first tubular member second end with the second tubular member comprise a tubular body middle portion, the inner walls of the tubular body middle portion having a reflective surface, each planar member having a common edge with the first tubular member.

7. The apparatus of claim 1, wherein the first polygonal cross section has four sides.

8. The apparatus of claim 1, wherein the second polygonal cross section has six sides.

9. The apparatus of claim 1, further comprising:
   a dividing member disposed within the first tubular member first end configured to separate the plurality of incoming light beams from each other prior to mixing.

10. The apparatus of claim 9, wherein the dividing member radially separates the first tubular member first end into a plurality of regions about a central longitudinal axis.

11. The apparatus of claim 10, wherein the dividing member includes a plurality of radial members, each radial member having a first end and a second end, each radial member first end being disposed towards a center portion of the first tubular member, each radial member second end being disposed at about the midpoint of a first tubular member side.

12. The apparatus of claim 10, wherein the dividing member separates the first tubular member first end into four regions for receiving up to four incoming light beams.

13. The apparatus of claim 1, wherein the ratio of a linear distance along the central axis of the first tubular member to a linear distance along the central axis of the second tubular member is between about 0.35 to 0.45.

14. A light mixing and homogenizing system, comprising:
a plurality of light sources, each light source providing a light beam having a unique wavelength;
a tubular body having a first end portion with a square cross section and a second end portion with a hexagonal cross section, the first end portion being configured to receive the plurality of light beams, the tubular body second end portion being configured to output a homogeneous light beam comprising a mixture of the incoming light beams, an interior portion of the tubular body having a highly reflective surface configured to reflect light from the plurality of incoming light beams causing a mixing and homogenizing of the plurality of light beams; and
a divider disposed within the tubular body first end portion configured to separate the incoming light beams prior to mixing.

15. The apparatus of claim 14, further comprising:
a control unit for determining a light intensity level for each of the plurality of light sources.

16. The apparatus of claim 15, wherein the control unit determines a wavelength of output light for each of the plurality of light sources.

17. The apparatus of claim 14, wherein the plurality of light beams each have a gaussian profile.

18. The apparatus of claim 14, wherein the output light beam has a top-hat profile.

19. A method of mixing and homogenizing a plurality of light beams, the method comprising:
receiving the plurality of incoming light beams into a divided first portion of an optical funnel, each incoming light beam having a substantially unequal intensity distribution;
mixing the received plurality of incoming light beams within an undivided second portion of the optical funnel to produce a mixed light beam;
homogenizing the mixed light beam to produce a homogenized light beam having a substantially equal intensity distribution; and
outputting the homogenized light beam.

20. The method of claim 19, wherein mixing the received light beams within an undivided second portion of the optical funnel further comprises:
reflecting each of the incoming light beams from at least one interior surface of the optical funnel second portion.

21. The apparatus of claim 19, wherein the optical funnel first portion has a first diameter and the optical funnel second portion has a second diameter, the first diameter being larger than the second diameter.

* * * * *